Nov. 7, 1939. T. A. REID 2,179,350
SYNCHRONIZED MOTOR
Filed April 10, 1937
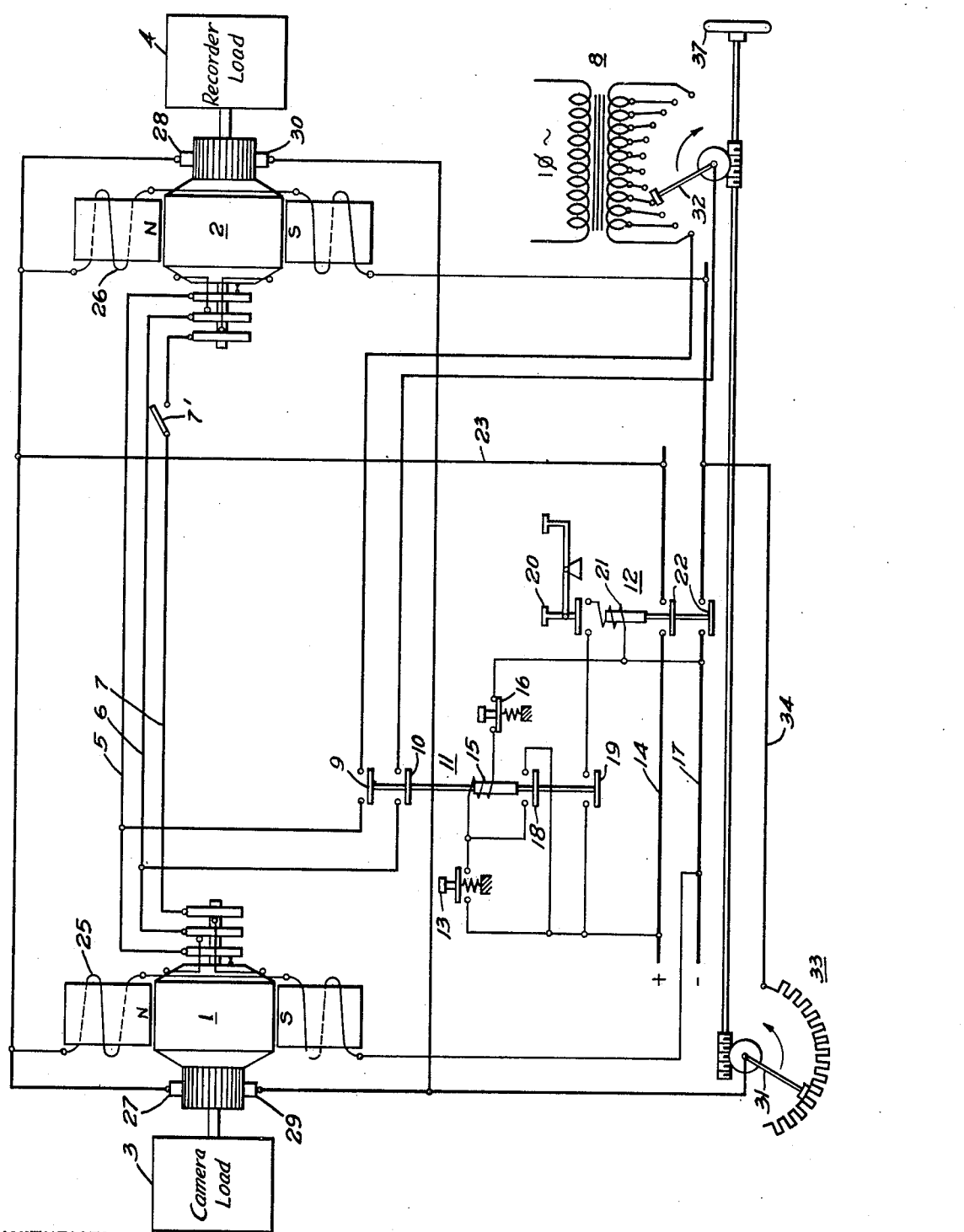
WITNESSES:
Michael Stark
Wm. C. Groome
INVENTOR
Thomas A. Reid.
BY
Paul E. Friedemann
ATTORNEY Patented Nov. 7, 1939

2,179,350

UNITED STATES PATENT OFFICE 2,179,350

SYNCHRONIZED MOTOR

Thomas A. Reid, Glendale, Calif., assignor to Westinghouse Electric & Manufacturing Company, East Pittsburgh, Pa., a corporation of Pennsylvania Application April 10, 1937, Serial No. 136,133

3 Claims. (Cl. 172—293)

This invention relates to systems of control for motors, more particularly to systems of control for maintaining two or more direct current motors in synchronism.

Devices and systems of control have heretofore been known for maintaining two or more alternating current electric motors in synchronism, and the principles used with some of such motors have also been used to maintain synchronous operation of two or more direct current motors. With the devices of the prior art, motors could be maintained in synchronism once the motors were up to their normal operating speed, but synchronous acceleration could not be secured nor could such motors be electrically locked and maintained in proper relation at zero speed.

One object of my invention is to lock two or more motors in proper relation at zero speed.

Another object of my invention is to obtain and maintain a stationary and rotating interlock between two or more direct current motors.

It is also an object of my invention to obtain and maintain a stationary interlock between two or more direct current motors.

A still further object of my invention is to obtain and maintain a selected relation between corresponding points on the rotating elements of two or more direct current motors regardless of the speed of such elements.

Other objects and advantages will become more apparent from a consideration of the following specification and the claims thereto appended and the accompanying drawing, in which, the single figure constitutes a diagrammatic showing of a pair of direct current motors controlled with my system of control which is also shown diagrammatically.

My system of control is particularly adaptable to the simultaneous and synchronous recording of sound and pictures in the motion picture industry. My invention is, however, not limited to this field but may be applied in many industrial applications and also be used in other motion picture work such as back ground projection, where it is necessary to electrically interlock the projection machine and the camera at standstill, or in re-recording or other work requiring the interlocking of two or more pieces of apparatus.

Generally, my system consists of two or more direct current motors each driving its own piece of apparatus such as a camera and a recorder. The armature of each direct current motor is tapped with three leads spaced 120 electrical degrees apart and these leads, through slip-rings and brushes are connected together in proper phase relation as a three phase synchro-tie connection. This much of the system constitutes a running or rotating interlock due to the alternating current voltage developed in the motors and impressed on common conductors.

In an effort to get a standing interlock, I discovered that the application of an alternating current voltage to the leads or connections between one pair of slip rings namely, across one phase, provides such standing interlock. The alternating current thus applied to the slip rings may be of any commercial frequency and voltage and may be left connected to the leads, or conductors, interconnecting the slip rings during the entire time of operation, that is, for successive complete cycles of operation ranging from and including zero speed of the motors up to their normal speed.

Referring to the figure, the reference character 1 designates a motor of the direct-current type which is to be maintained in synchronism with motor 2. For the purposes of this specification we shall consider the word "synchronous" to mean having the same period and phase position. Motor 1 is shown connected to a load 3 which may be designated a camera load, whereas motor 2 is coupled to a load 4 which may be designated a recorder load. These motors are alike in capacity and design and they will have the same rating and otherwise the same mechanical and, as near as possible, the same electrical characteristics and are also of the rotary converter type, which have a commutator at one end and three slip rings at the other end of the rotor, the slip rings being connected to the armature winding at three points spaced 120 electrical degrees apart. These motors may, in general, be considered as designed for operation on 110 volt direct-current circuits.

It will be noted that the slip rings shown at the alternating-current ends of the motors are interconnected by leads 5, 6 and 7, the interconnection being such that if the rotors have corresponding mechanical phase positions, the windings will be interconnected also to have like electrical phase relation, if these motors be considered as in operation, namely, both of them driving their loads. If there be a tendency on one of the motors, by reason of a variation of its load or any other reason, to pull out of synchronism, the current circulating in the leads 5, 6 and 7 will maintain synchronous operation. This interconnection of the armature windings is known as a synchro-tie connection. If the motors are stopped and one rotor should drift farther than the other, the motors will upon the second starting, operate in such a manner as to have the same period, but they will not be in synchronism in the sense that the rotors will also have corresponding phase positions. Further, if these motors are operated at variable speed, the synchronous operation may be lost although the motors will operate in such a manner as to have the same period. For apparatus used in the motion picture industry of a semi-portable character or for news-reel work or for use on location and various other types of work where it is difficult to maintain constant speed and very often not desirable to maintain constant speed of the motors, such failure on the part of two or more motors to operate in predetermined synchronism may be quite detrimental to the proper taking of pictures and the recording of sounds.

With my system of control, I provide a single phase source of alternating-current evidenced by the transformer 8. The secondary of the transformer is provided with a number of leads or taps so that the voltage taken from the secondary may be varied at will. This single-phase source of alternating current I interconnect with two of the leads 5 and 6, as shown, through the contact members 9 and 10 of an electromagnetic switch 11. The electromagnetic switch 11 also controls a starting contactor 12 for energizing the motors 1 and 2 with direct-current. Neither electromagnetic switch 11 nor the starting contactor 12 are absolutely necessary in the particular arrangement I have shown. It is sufficient to obtain the novel results of my invention that a source of alternating-current of suitable voltage be available for interconnection with the leads 5 and 6 and that a suitable source of direct-current be available for interconnection with the armatures and field windings of the motors 1 and 2, respectively. Furthermore, it is not essential that the voltage taken from the secondary of the transformer 8 be adjustable. Broadly, the novel results of my invention are attained if the camera and the recording mechanism are brought in proper phase relation and then the leads interconnecting the slip rings be energized with a single-phase alternating-current. Under this condition that is, the instant the leads are energized with alternating-current, the two motors if not quite in correct position jump into correct phase position and the voltage generated in the fields, which will at such time as shown in the drawing be connected in parallel, will build up and be directly opposed. The motors 1 and 2 will thus be firmly interlocked and held in a given position; that is, corresponding points on the rotors will be maintained in a given position with reference to each other even though the motors are at rest. The direct-current may thereafter be applied to the motors and the motors brought up to normal speed. The motors will thus operate in synchronism throughout the period of acceleration from and including the zero speed up to the normal speed of the motors.

A still better understanding of my invention can probably be had from a study of a typical cycle of operation. Assuming that the motors 1 and 2 are at rest and not energized at all, and it is desired to start the camera and the recorder and thereafter maintain synchronous operation for successive cycles of operation as well as variations in speed of the motor. Assuming further that the busses designated at 14 and 17 are suitably energized with direct-current and that the transformer 8 is energized from a suitable source of alternating current. To start the operation of my system of control, the attendant makes certain that switch 7' is open and then actuates the starting switch 13, thereby establishing a circuit from the positive direct-current bus 14 through the starting switch 13, actuating coil 15 of the electromagnetic switch 11 and stop switch 16 to the negative conductor 17. As soon as the actuating coil 15 is energized, contact members 9 and 10 are closed whereupon the motors have two of the leads, namely, 5 and 6, of the synchro-tie connection energized with a single-phase of alternating-current of suitable voltage and the motors immediately lock into a given position. Switch 7' may be open while motors 1 and 2 are at rest, but should be closed when the motors are running.

Operation of electromagnetic switch 11 also causes the closing of contact members 18, which contact members merely establish a holding circuit for the actuating coil 15, so that the attendant may release starting switch 13. Contact members 19 are also closed. The closure of contact members 19 merely makes it possible to energize the motors 1 and 2 by a suitable operation of the starting contactor 12.

To start the operation of the motors 1 and 2 the attendant actuates the switch 20, whereupon a circuit is established from the positive conductor 14 through contact members 19, switch 20 and actuating coil 21 of the starting contactor 12 to the negative bus 17. The operation of the starting contactor 12 causes the closing of contact members 22 whereupon a circuit is established from the positive bus 14 through the upper contact member 22, conductor 23, field windings 25 and 26 connected in parallel and the lower contact member 22 to the negative bus 17. A circuit is also established by the operation of the starting contactor 12 for the armatures of the motors 1 and 2. It will be noted that conductor 23 is directly connected to the upper terminals, or brushes 27 and 28, of the motors 1 and 2, respectively. The lower brushes 29 and 30 of motors 1 and 2 are connected to the arm 31 of a starting rheostat 33, through several sections of the starting rheostat 33 to conductor 34 and through the lower contact member 22 to the negative bus 17.

At the time of operation of the electromagnetic contactor 12, the rheostat arm 31 should be in such a position as to include the maximum amount of resistance in the armature circuit of the respective motors. In fact, arm 31 could be in such a position as to still maintain the armatures of the motors on open circuit. Whichever the position may be, the attendant will actuate handwheel 37 rotating it so that the nearer portion of the wheel moves downwardly, thereby causing the arm 31 of the rheostat 33 to move counter-clockwise. It will thus be apparent that both motors 1 and 2 simultaneously have their voltage increased and will thus increase their speeds to any value desired.

It should be noted that the handwheel 37 also actuates the voltage adjusting arm 32, cooperating with the secondary of the transformer 8. It has been found that best results are secured if the single-phase alternating-current voltage is maintained approximately equal to the voltage generated by the motor in one of the phases of the armature windings. The arm 32 is, as shown, interconnected mechanically with the handwheel 37, so that as the speed of both motors increases, the alternating-current voltage impressed on the alternating-current leads of the motors will also be increased. As indicated, the arm 32 will move counter-clockwise with an increase of speed of the motors. It should be noted, however, that when the speed of the motors is decreased, that is, namely, when arm 31 moves clockwise arm 32 moves counter-clockwise. The design should, however, be such that the voltage of the secondary of the transformer 8 is not decreased to zero but should be maintained at a value sufficiently high to obtain and maintain the interlocking of the rotors of the motors 1 and 2 even at zero speed. In other words, the alternating-current voltage impressed on the synchro-tie leads 5 and 6 should not, during the entire operation of the motors, be reduced to zero.

Once the motors, and thus the loads connected to the motors, have been synchronized, the attendant may start and stop the motors by suitable manipulation of the handwheel 37 without at any time losing the interlocked relation of the two motors and the loads connected to them. The motors will stop when the armatures are disconnected at the rheostat 33, but will remain locked in a given phase position and then when the rheostats are operated, the motors will operate in synchronism without of course having lost the proper phase relation. Regardless of the variation of the voltage and thus the speed of the motors, the motors will operate with the same period and the same phase position, maintaining such phase position whether in operation or at rest.

While I have shown electromagnetic starting means which are so arranged that the alternating current is supplied to the motors before the direct-current can be connected to the motors, and while I have shown certain voltage control for the alternating current to be supplied to the motors as well as certain voltage control for the direct-current voltage to be supplied to the armatures of the motors, I do not limit myself to the specific showings made. As a matter of fact, no voltage adjustment for the alternating current to be supplied to the motors need be provided at all, provided the original selection of the voltage value is correct. Such selected voltage value may be a trifle larger than needed at very slow speeds or at zero speed but the losses are not appreciable and may thus be disregarded. Similarly, the rheostats 33 and 36 need not necessarily be provided. Any suitable switching means and starting control for the motors will suffice so long as the attendant maintains the proper order of starting the two motors; namely, of energizing them with alternating-current first after the proper phase position for the rotors has been selected and thereafter simultaneously energizing the motors with direct-current. For small machines, such simultaneous energization may frequently mean full voltage starting, thus eliminating the need of starting rheostats.

I am, of course, aware that others particularly after having had the benefit of the teachings of my invention, may readily devise other circuit diagrams or other means for accomplishing the novel results I have disclosed in this application and I, therefore, do not wish to be limited to the specific showing nor the specific description given but wish to be limited only by the scope of the appended claims and such prior art as may be pertinent.

I claim as my invention:

1. In a system of control for electric motors, in combination, a pair of direct-current motors having their armature windings and field windings connected in parallel, synchro-tie connections between the armature windings, a source of alternating current, a source of direct current, means adapted to connect said source of alternating current to said synchro-tie connections, means adapted to simultaneously connect said armature windings and field windings to said source of direct current, and means for simultaneously varying the voltages applied to said motors of said source of alternating current and said source of direct current.

2. In a system of control for electric motors, in combination, a pair of direct-current motors having armature windings and field windings all connected in parallel, synchro-tie connections between the armature windings, a source of single phase alternating current, a source of direct current, and electromagnetic control means adapted to connect said single phase source of alternating current to said synchro-tie connections and thereafter automatically connect said source of direct current to said armature windings and said field windings.

3. In a system of control for electric motors, in combination, a pair of direct current motors having armature windings and field windings all connected in parallel, synchro-tie connections between the armature windings, a source of single phase alternating current, a source of direct current, electromagnetic control means adapted to connect said single phase source of alternating current to said synchro-tie connections and thereafter automatically connect said source of direct current to said armature windings and said field windings, and means for simultaneously varying the voltages of the said sources of current applied to the said motors.

THOMAS A. REID.